INVENTOR:
VAUGHAN MORRILL

By Kane, Dalsimer and Kane
ATTORNEYS

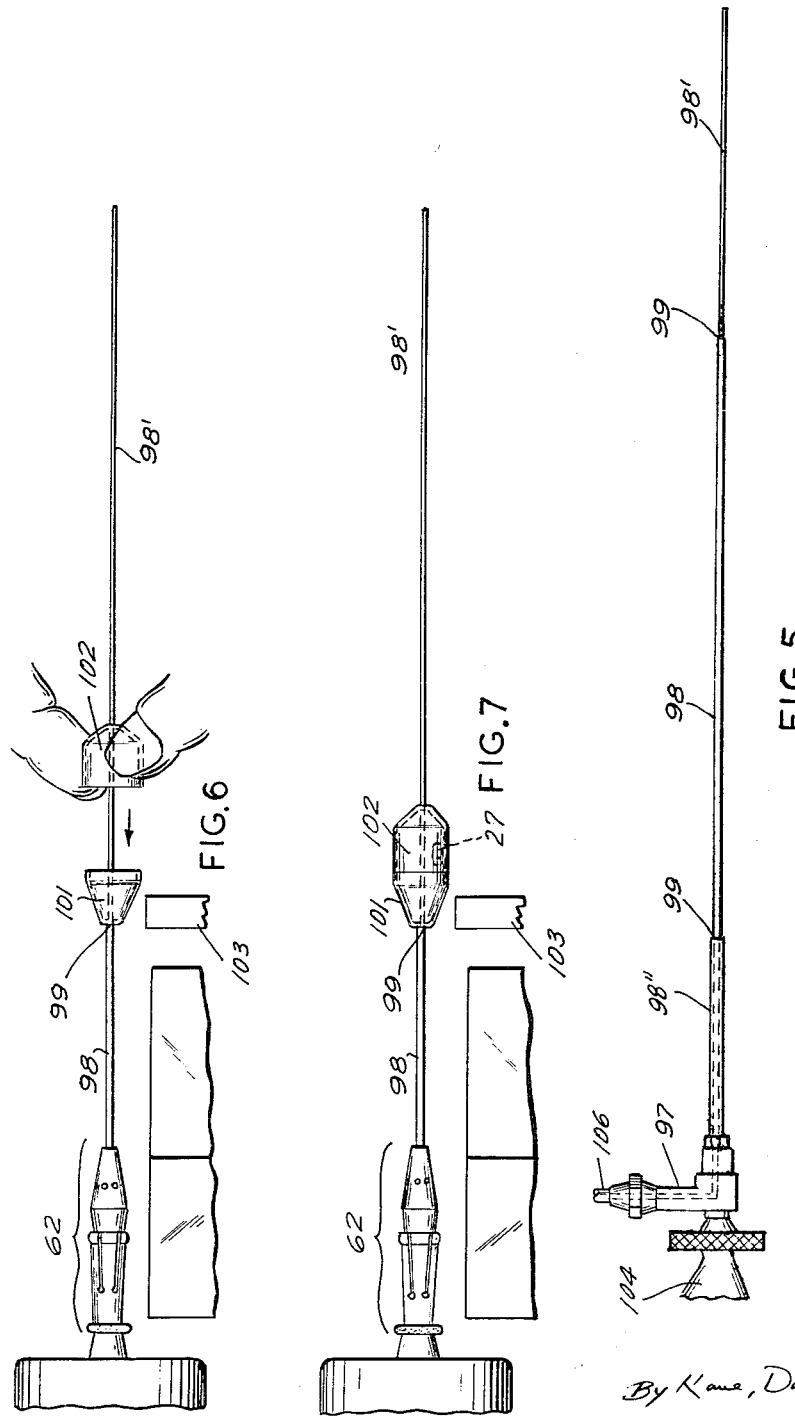

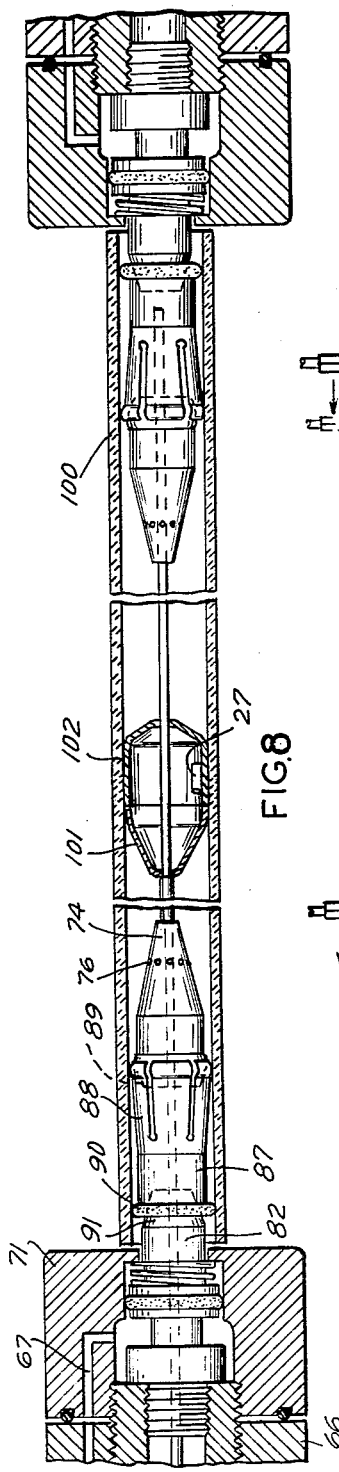

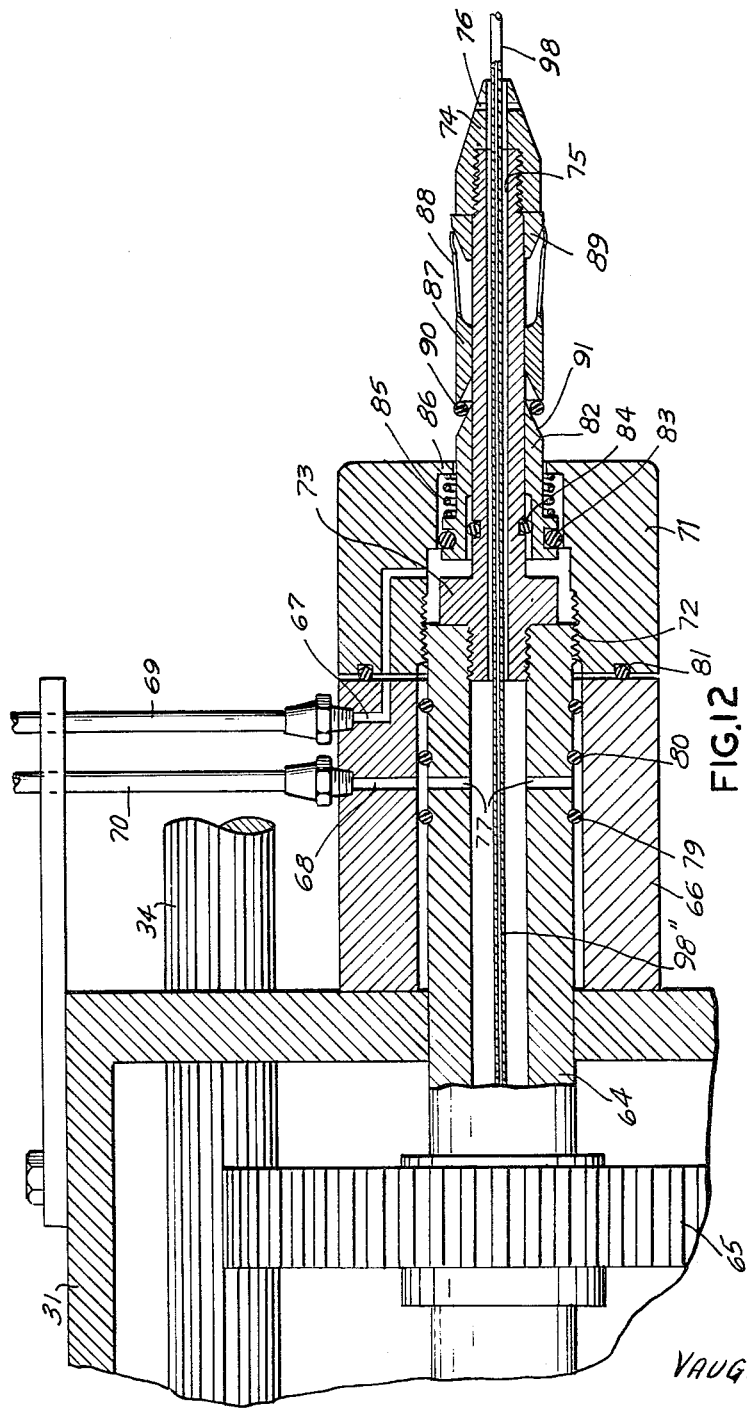

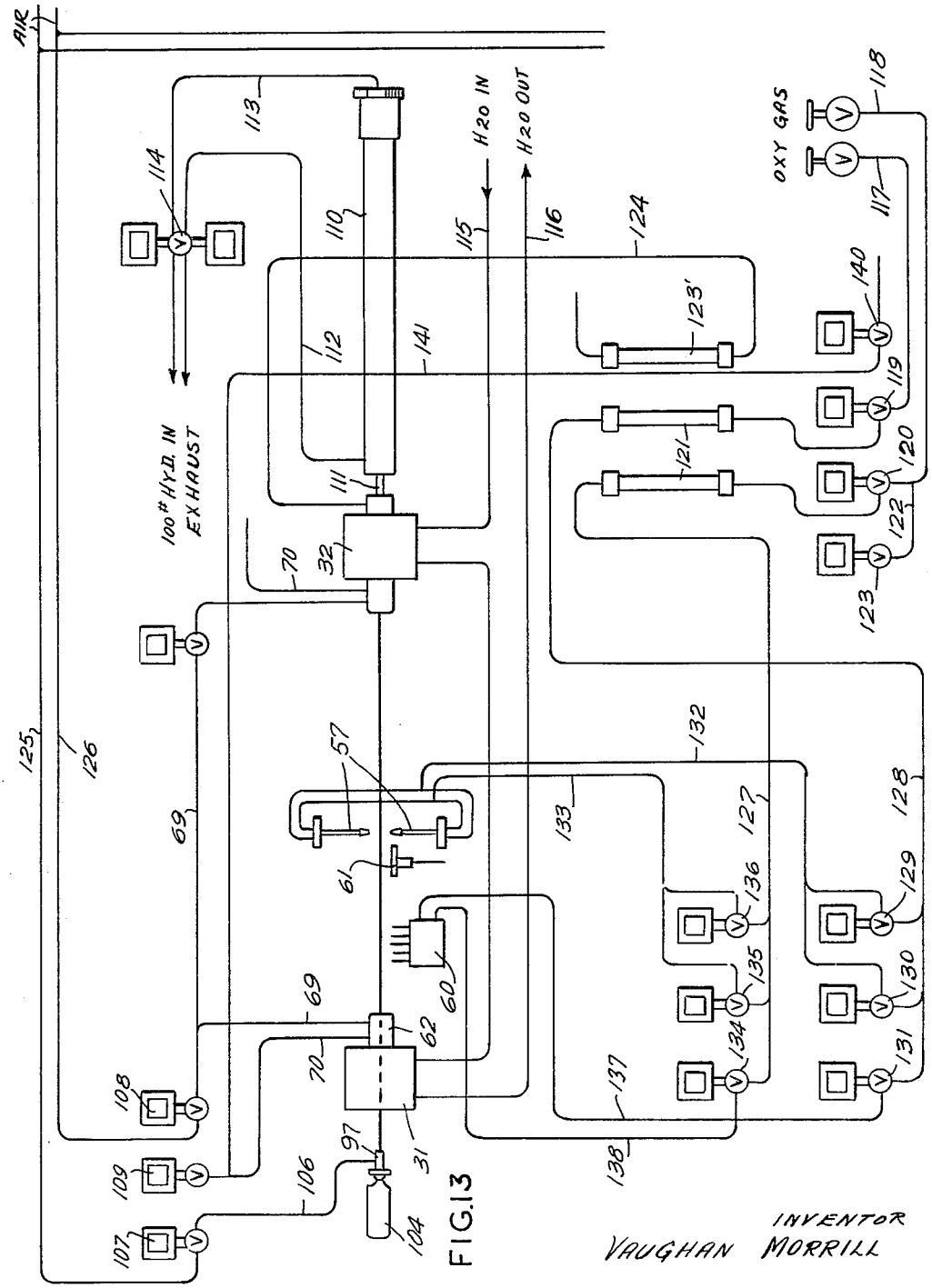

United States Patent Office 3,091,105
Patented May 28, 1963

3,091,105
APPARATUS FOR SHRINKING TUBULAR
GLASS BLANK
Vaughan Morrill, 9747 Litzinger Road, Brentwood, Mo.
Filed Oct. 12, 1959, Ser. No. 845,971
6 Claims. (Cl. 65—271)

This invention relates to a structurally and functionally improved forming machine capable of use in numerous different associations, but intended primarily for the forming of tubular articles such as pipettes. This application is a continuation-in-part of my prior application Serial No. 733,794 on "Glass Articles and Method of and Apparatus for Fabricating Them" filed on May 5, 1958.

It is a primary object of this invention to provide a machine which will require a minimum of attendance and manual control. The entire forming operation will preferably be accomplished by a substantially automatic technique; the sequential operation of the parts resulting in the production of an improved tubular finished article.

A further object of the invention is that of providing a relatively uncomplicated mechanism embracing few components, individually simple and rugged in design, and when assembled, providing an apparatus functioning over long periods of time with freedom from all difficulties.

With these and other objects in mind, reference is had to the attached sheets of drawings illustrating practical embodiments of the invention, and in which.

Figure 1:
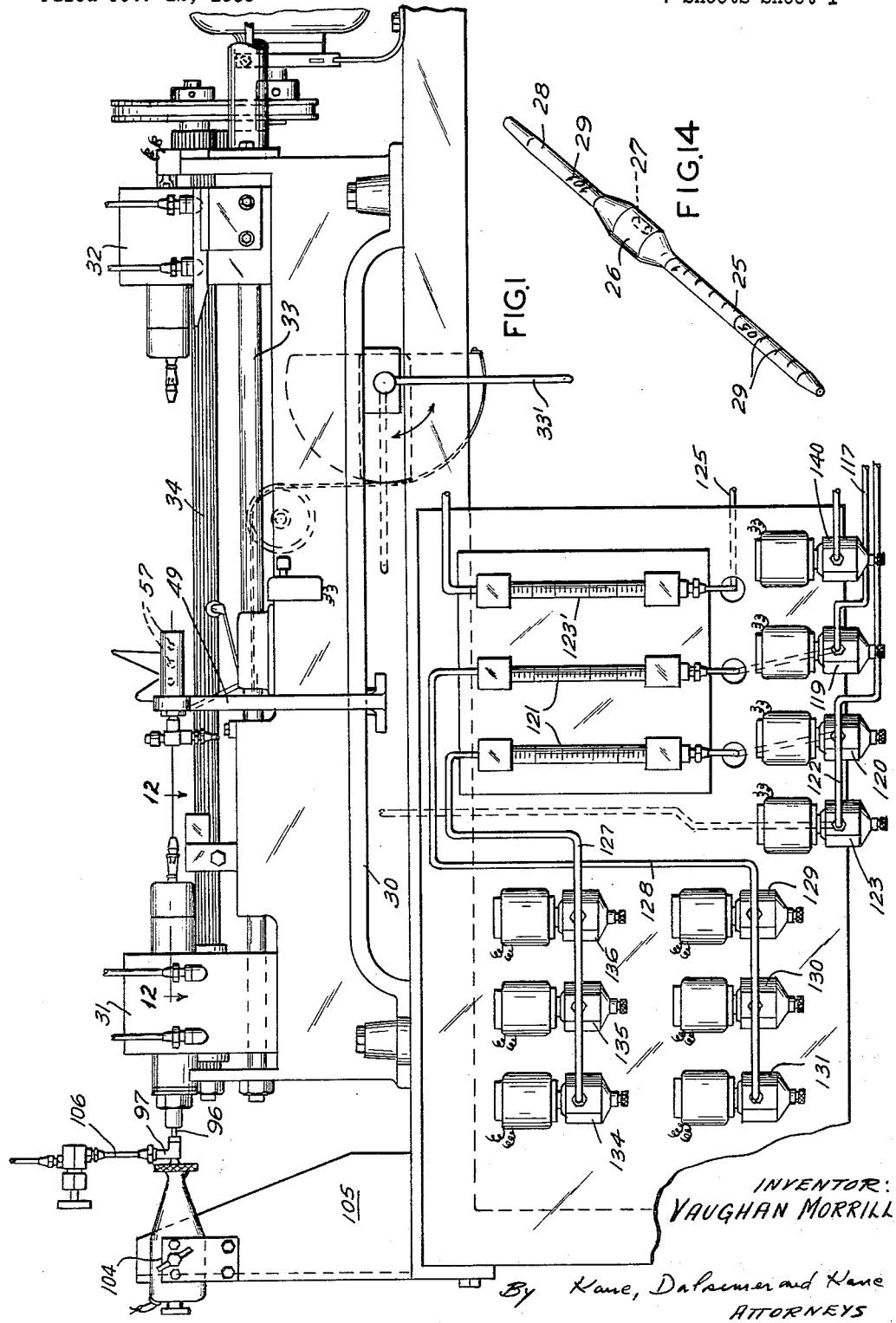
FIG. 1 is a somewhat diagrammatic side elevation of a forming machine.
Figure 2:
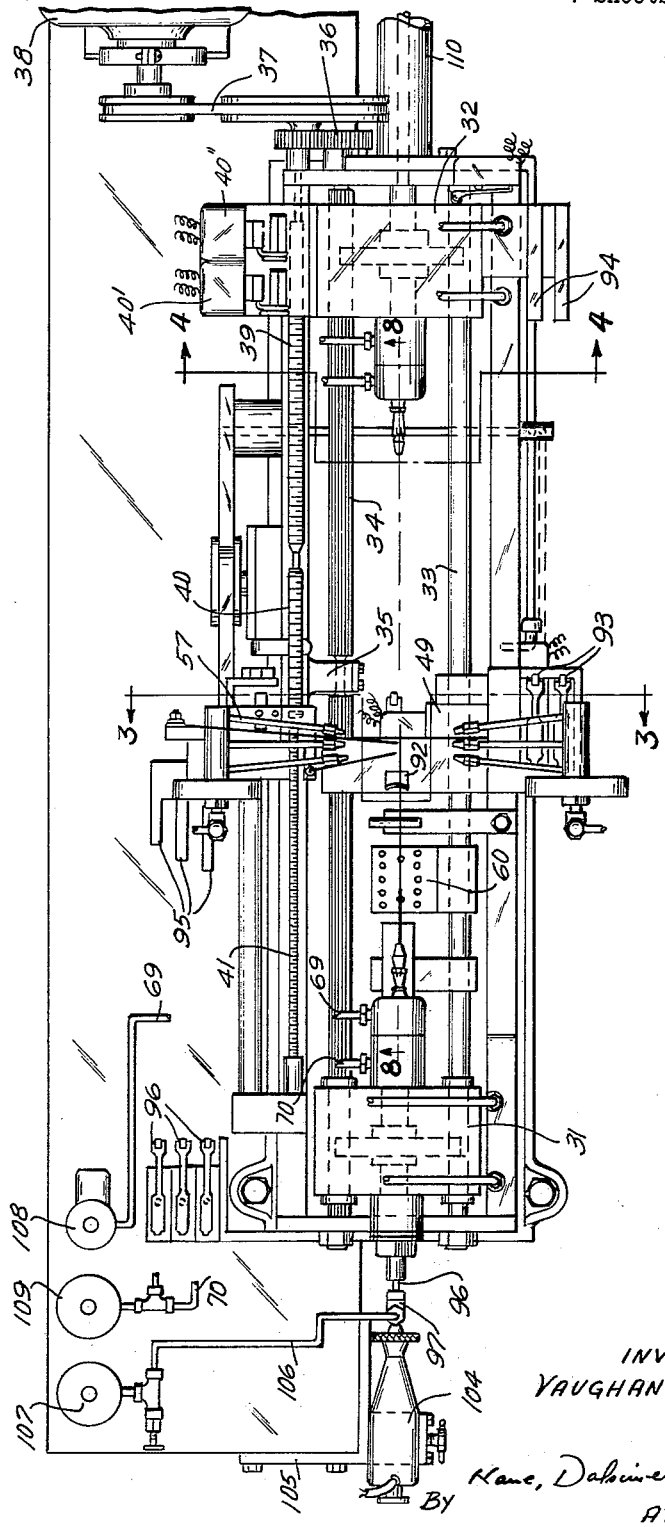
FIG. 2 is a plan view thereof.
Figure 3:
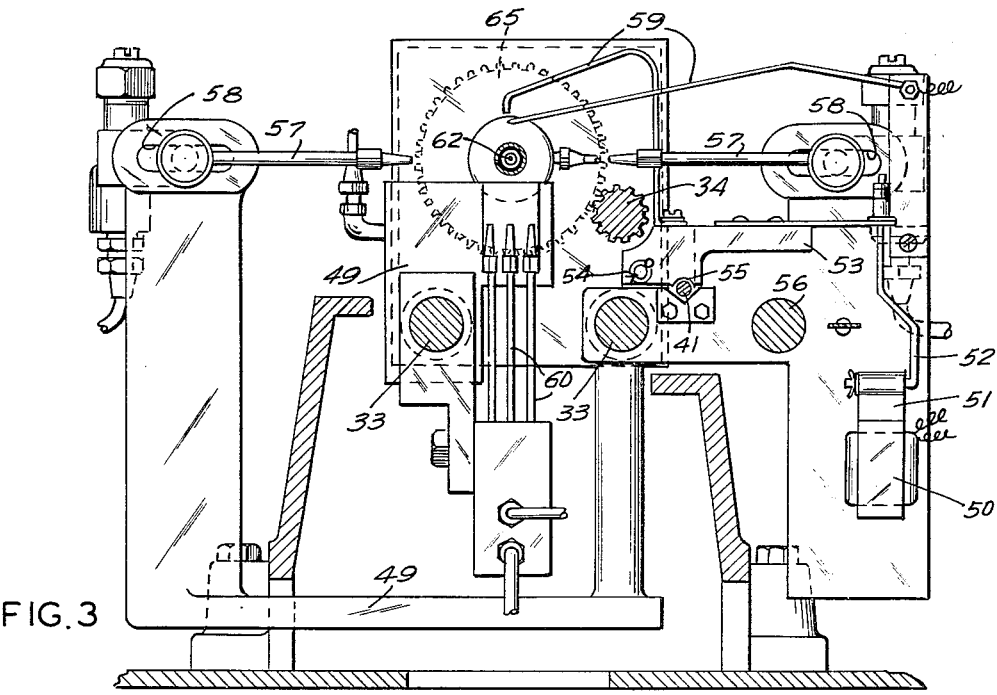
Figure 4:
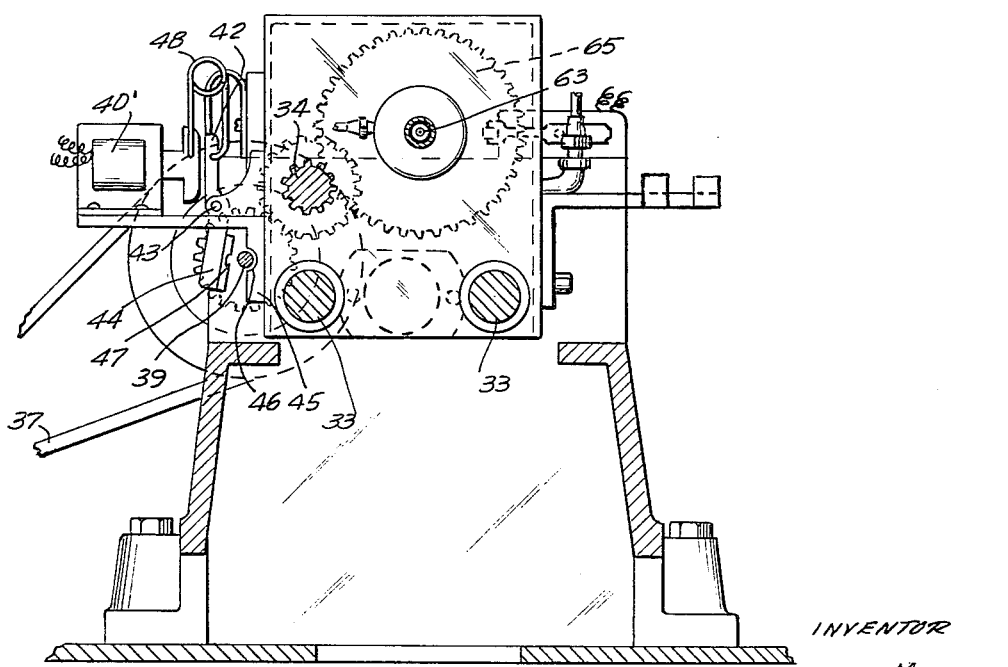

FIGS. 3 and 4 are transverse sectional views taken respectively along the lines 3—3 and 4—4, in the direction of the arrows as indicated in FIG. 2;

FIG. 5 shows a mandrel and a connection for communicating with its bore so that air may be caused to flow therethrough;

FIG. 6 is a somewhat schematic side view showing the positioning of a shell or form on a mandrel and the head stock spindle portion through which that mandrel passes;

FIG. 7 is a view similar to FIG. 6, but showing the form in final assembled condition upon the mandrel;

FIG. 8 is a fragmentary sectional side view taken along the line 8—8, in the direction of the arrows as indicated in FIG. 2, with a mandrel and tube extending between the spindles;

FIGS. 9, 10 and 11 are somewhat diagrammatic representations of the heating means cooperating with the tube in order to shape the latter to desired dimensions, with the assistance of atmospheric pressure;

FIG. 12 is a fragmentary enlarged sectional plan view taken along the line 12—12, in the direction of the arrows as indicated in FIG. 1;

FIG. 13 is a view schematically showing the several controls preferably associated with the machine so that it may function in an automatic or semi-automatic manner;

FIG. 14 is a perspective view of a pipette unit as produced by a machine of the present type; and FIG. 15 is a fragmentary sectional view of parts adjacent the tail stock assembly.

Referring primarily to FIG. 14, in which a preferred design of pipette has been shown, the numeral 25 indicates a stem provided with a capillary bore. The upper end of this stem terminates in an enlargement 26 defining a chamber in communication with that bore. This chamber may, for example, receive a predetermined quantity of blood, to which diluent is added to provide a proper solution. To this end, a mixing bead or pellet 27 is disposed within the chamber. Beyond the latter the unit is continued in the form of a tube 28 having a relatively large bore. As is well understood, the latter bore provides a passage through which suction may be exerted to draw up predetermined quantities of body liquid and diluent into the chamber defined by the enlargement 26. The exterior portions of the tubes 25 and 28 are preferably provided with indicia 29 in the form of graduations such that the volume of liquids may be precisely determined.

Such a unit is formed on a machine which is the subject matter of the present application, and which, as generally shown in FIGS. 1 to 4, includes a base 30, a head stock 31 and a tail stock 32. The head stock is conveniently secured to a pair of parallel rods 33 supported by the base. The tail stock is slidable upon these rods and overlies a toothed or sprocket shaft 34. If desired, the tail stock may additionally have sliding bearing with edge portions of the base or parts ancillary thereto, so as to be properly mounted and guided in alignment with the head stock. A manual control 33' serves to release and return the burner carriage 49 to its starting position.

As particularly shown in FIG. 2, sprocket shaft 34 may be rotatably supported intermediate its ends by a bracket 35, and continues to a point in line with the head stock 31. This shaft at its opposite end continues past the tail stock and carries a gear included in a gear train 36 driven by, for example, a belt drive 37 coupled to a motor 38. Extending parallel to shaft 34 and operatively connected to gear train 36, is a second or feeding shaft having threaded zones 39, 40 of different pitch, and 41 of an opposed pitch. Therefore, when motor 38 is operating, the latter shaft as well as shaft 34 will rotate. That motor, in addition to performing these driving functions, may serve to operate other units of the assembly.

Tail stock 32 supports solenoids 40' and 40". As in FIG. 4, each of these solenoids is provided with an armature 42 pivoted as at 43 and terminating in an extension 44. The tail stock also supports a plate 45 provided with a semicircular recess 46 for the accommodation of shaft portions 39 and 40. Within the extension 44 of the armature, a semicircular groove 47 is formed. This groove is provided with threads. Those threads, in the case of one solenoid assembly, will correspond to the threaded portion 40 of the shaft. In the case of the other solenoid, they will correspond to the threaded portion 39 of that shaft. Springs 48 are included in each solenoid assembly and serve normally to maintain the extensions 44 in positions at which they do not cooperate with the threads of the shaft. It is apparent that by selectively energizing the solenoids, the tail stock will be coupled to the threads included in either shaft portion 39 or shaft portion 40, and will be fed at a speed corresponding to the pitch of those threads as the shaft is rotated.

Disposed between the head and tail stocks is a burner carriage 49. This carriage is moved by the opposed threaded portion 41 of the feed shaft. To achieve this result, a solenoid 50 (FIG. 3) is supported by the carriage and has its armature 51 connected by a rod 52, in any desirable manner, with a fixture 53 pivotally mounted as at 54. That fixture has a threaded portion 55 engageable with the threaded zone 41 of the feed shaft. Except when solenoid 50 is de-energized, a spring (not shown) serves to maintain portion 55 of the fixture 53 out of engagement with the threads of shaft portion 41. When solenoid 50 is energized and the portion 55 is in operative engagement with the threaded zone of the feed shaft, the latter will serve to shift carriage 49 from the right to the left, as viewed in FIGS. 1 and 2. A rod 56 assists in the slidable support of carriage 49.

Carriage 49 carries a pair of burners 57. These, as shown in FIG. 3, are preferably arranged in opposed relationship to each other and in line with the axis of the machine as defined by the spindles 62 and 63 associated with the head and tail stocks respectively. These burners or nozzles are adjustably mounted, as at 58, by extended portions of carriage 49. The latter also carries conducting elements 59 spaced from each other to provide a spark gap in the region of ignitible gas discharged by burners 57. Underlying the axis defined by spindles 62 and 63 is a burner assembly 60. Disposed adjacent the same, as illustrated in FIG. 13, is a flash pilot 61, which serves to ignite the gas discharged from the nozzles of this burner group.

Now considering the detailed structure of the spindles as generally indicated at 62 and 63, attention is invited to FIGS. 8 and 12. The two spindle assemblies should be of generally similar construction. Therefore, only the head stock will be described in detail. Thus, as in FIG. 12, the numeral 64 indicates a tube, to which there is connected a gear 65. The teeth of the latter mesh with the teeth of pinion shaft 34. Therefore, when that shaft turns, tube 64 will be rotated. A similar gear being connected to shaft 34 and the spindle of the tail stock, it follows that the latter will rotate in synchronism with the spindle of the head stock.

Disposed adjacent the inner face of head stock 31 is a tube 66. This is concentrically arranged with respect to the adjacent end of tube 64. Passages 67 and 68 are formed in tube 66. Supply and venting pipes 69 and 70 respectively are connected to these passages. A cap piece 71 is in turn arranged beyond tube 66, and is conveniently mounted by threads 72 upon the outer face of tube 64. Upon the bore face of the latter, further threads are conveniently formed to provide a mounting for the base of a tube 73. That tube supports at its outer end a nose piece 74. The latter is provided with a bore 75, which at one end communicates with a series of radially extending openings 76. At its opposite end, it communicates with the bores of tube 73 and 64. An annular series of openings 77 formed in tube 64 provide communication with the passage 68 connected to the venting pipe or conduit 70.

A suitable seal may be provided between the forward plate of the head stock 31 and tube 64. Seals such as O-rings 79 and 80 are disposed to both sides of ports 77. An additional seal 81 is interposed between the adjacent surfaces of tube 66 and cap 71. Therefore, fluid flowing through passage 68 will be confined and prevented from moving axially over the outer surface of tube 64. Also, with the outer opening of cap 71 being sealed, fluid flowing from pipe 69 through passage 67 will not escape from the space between the surface of tube 73 and the inner faces of cap 71.

To furnish such a sealing structure for the cap, and which structure will also function as a piston, a sleeve member 82 is slidably disposed upon tube 73. This sleeve has an inward skirt portion supporting a sealing ring structure 83. A further sealing or O-ring 84 is interposed between the inner face of this skirt and the adjacent surface of tube 73. A spring 85 has one of its ends bearing against the skirt of the sleeve, and its opposite end bears against a flange 86 which defines what might be termed the cylinder portion adjacent the outer end of the cap.

Slidably disposed upon tube 73 in advance of sleeve 82 is a collet 87. The latter is provided with an annular series of spring fingers 88 generally extending parallel to the axis of the spindle. These fingers ride over the surface of a truncated cone member 89 which occupies a position adjacent the inner end of nose piece 74. An expansible O-ring or similar unit 90 is disposed adjacent the inner end of collet 87. As sleeve 82 shifts, this ring rides and expands over the inclined surface 91 formed at the outer end of that sleeve.

As will be apparent, if fluid under pressure is forced through pipe 69 and passage 67, it will flow into the space to the rear of the skirt portion provided as part of sleeve 82. That sleeve will normally maintain a retracted position under the influence of spring 85. The air will not be free to escape, because of packings or rings 83 and 84. Therefore, it will act against the base edge or surface of the sleeve and cause the latter to function as a piston and be projected. So projected, the sleeve will thrust against ring 90, which in turn will thrust against collet 87. The spring fingers 88 will yieldingly resist this thrust as they ride outwardly on the cone surface of member 89. As the resistance increases, the ring 90 will therefore expand. It is to be borne in mind that free and unobstructed passage for fluid may be afforded by openings 76, bore 75, ports 77, passage 68 and pipe 70.

As shown in FIG. 2, the machine base carries a center support 92, which assists in the positioning of the preform or tube as hereinafter described. As also shown in this view, a pair of switches 93 are preferably carried by the base to one side of support 92. These and similar switches are preferably of the micro type. Switches 93 are caused to operate by engaging cams or actuators 94. Conveniently, these actuators are mounted by tail stock 32. Additional cams or actuators 95 are supported for movement with the carriage 49. These selectively engage switches 96 mounted adjacent the head stock 31. As will be understood, when switches or solenoids are mounted upon moving parts, they will conveniently be connected by flexible leads with current-supplying and/or control assemblies. Likewise, burners which are movable may be connected by flexible tubing with a source of fuel supply. The same is true of ports serving to supply air or other gas or fluid under pressure, or to create a vacuum.

A hollow mandrel forms a part of the assembly. This mandrel, as in FIG. 8, extends through the bores of nose piece 74, tubes 73 and 64 and the head stock 31. Preferably, it projects beyond the outer face of the latter, and (FIGS. 1, 2 and 5) it may terminate in a bored fitting 97, supported in a manner hereinafter brought out. As in FIGS. 5 to 7 the intermediate zone 98 of the mandrel is of relatively reduced diameter, and is continued in an end part 98' of a lesser diameter. A positioning part in the form of a flange or shoulder 99 defines the adjacent ends of mandrel portions 98 and 98'. According to a preferred concept of the invention, sections 98 and 98' are tapered from left to right. The bore of the mandrel may have a diameter of .01 inch. The outside diameter of part 98' may be .02 inch, that of zone 98, .03 inch, and that of end portion 98, .05 inch. The outside diameters of sections 98 and 98' taper uniformly in a direction away from portion 98 at the rate of approximately .0001 inch to each inch of the length of these sections. The outside diameter of section 98 may increase in the direction of the fitting 97.

The free end of the mandrel also extends through the bores of the nose piece, 74, tube 73 and tube 64 at the tail stock end of the machine. As shown in FIG. 15, the end of the mandrel is unobstructed, so that fluid may be freely discharged from its bore. With air flowing through the bore of the mandrel and thence through and beyond tube 73, and with the inner end of that tube open, it follows that an aspirating action will occur. This will result in the pressure within the bore of tube 73 being reduced below atmospheric.

The pipette is formed from a member such as a glass tube, and in the present exemplification is provided with a central chamber. To furnish this, a form or shell is associated with the mandrel. As in FIG. 8a tubular glass member 100, open at both ends, is used and has an initial internal diameter slightly greater than that of the spindle assemblies 62 and 63 when the latter are in constricted condition. The form employed to provide the central chamber may embrace shell sections 101 and 102.

These sections may be disposed in abutting relationship. One of them will contain the pellet or mixing bead 27. Ordinarily it is preferred to employ a form comprising a pair of cup-shaped shells such as 101 and 102, rather than a single unit. They may be made of steel by a drawing operation, with a uniform outside accuracy of plus or minus .001 inch in over-all dimensions. In addition, they may be of such reduced thickness that their eventual elimination, as hereinafter brought out, will offer no difficulties. Conveniently, their exterior surfaces are sandblasted. This has the desirable result that even if the parts are heated to a high temperature, the glass of tubing 100 will not have any objectionable tendency to adhere to the surface of the bore, as would be the case if the latter were polished. Also, with sandblasting or an equivalent procedure resorted to, a frosted surface is produced on the bore face of tube 100 as the forming operation is completed. Such a frosted surface gives a positive indication, in subsequent use of the unit, as to whether or not its bore surface is dry. In other words, when dampness exists, the frosted appearance disappears, which fact will render the user aware that the unit is not properly dried.

As especially shown in FIG. 6, and with the use of a form including a pair of perforated cup sections, part 101 is brought to a position abutting flange 99. Part 102, with a pellet 27 contained therein, is then disposed in operative relationship to part 101; the positioning flange 99 preventing the form from being moved beyond a predetermined point due to the limited diameter of the shell perforations. A magnet 103 is disposed adjacent spindle assembly 62 and serves to maintain the sections of the forms 101—102 against separation or movement with respect to the mandrel. If it is not desired to employ a magnet, then other suitable means may be utilized to assure a proper positioning of the parts. For example, the right-hand end of the mandrel, as viewed in the several figures, may be elevated above its left-hand end. Under these circumstances, maintenance of the cups with respect to each other and to the mandrel will be assured by gravity.

It is preferred that the mandrel have axial movements imparted to it. To this end, and as illustrated in FIGS. 1 and 2, a vibrator 104 may be suitably mounted upon a support 105 and be connected to the fitting 97 on the outer end of the enlarged section 96 of the mandrel to support the latter. This vibrator is conveniently of a simple A.C. type. It may be operated at 7200 cycles per minute on ordinary 60 cycle alternating current. Higher or lower rates of vibration may also be employed. In any event, there will be imparted to the mandrel, reciprocating movements axially of its body; these movements having a relatively limited range.

A source of air under high pressure is connected with tube 106, which is coupled with the fitting 97, so that this air may flow through the bore of the mandrel. The flow of fluid through tube 106 is preferably controlled by a solenoid-actuated valve, indicated at 107. Tube 69 likewise connects with a source of fluid (preferably air) under pressure. A solenoid-actuated valve 108 controls the flow of fluid through that tube. A corresponding unit 109 controls communication through tube 70 with the atmosphere. The layout of these tubes has been schematically shown in FIG. 13.

In this view and in FIG. 2 there has also been indicated a cylinder 110 within which a piston moves to shift a rod 111 coupled to tail stock 32. Alternate flow of fluid under pressure to opposite ends of this cylinder occurs through lines or tubes 112 or 113 and is controlled by a valve assembly 114, which preferably is governed in its operation by a solenoid. Cooling water may be supplied to the head and tail stock assemblies through a tube 115, and has a return flow through line 116. Valve-controlled lines 117 and 118 may be provided to supply oxygen and gas respectively. Interposed in these lines are valves 119 and 120, which preferably are solenoid-operated. Beyond these valves, flow meters 121 are interposed in the lines.

A branch line 122 may connect with line 118 and have interposed in it a similar valve 123 which serves to govern the flow of gas to the igniter 61. A further flow meter 123' may be connected to line 124 receiving the air expelled through the hollow mandrel. The air for the mandrel is supplied at a pressure of around 500 pounds to the square inch through line 125. Line 126 supplies air at suitable pressure to the branch lines 69.

Line 127 is connected to a flow meter and controlled by valve assembly 120. A further line 128 is connected to the flow meter 121 in series with the valve assembly 119. Line 128 is provided with branches within which there are interposed solenoid-controlled valves 129, 130 and 131. The first two of these branches merge into a single line 132 coupled to the manifold for the burners 57. A second line 133 is also connected to this manifold and terminates in branches, the flow through which is controlled by valve assemblies 135 and 136. These branches are coupled to line 127. A further valve assembly 134, connected to the last branch of line 127, serves to control the flow of fluid through line 138 extending to burner 60. The microswitches (FIG. 2) or their equivalents in groups 93 and 96, as controlled by actuators 94 and 95, serve to govern the operation of the various solenoid control valves previously described. In addition, further suitable controls or assemblies may be furnished which will enable the apparatus to function in a substantially automatic manner.

Considering the operation of the machine, it will be understood that the tail stock 32 is initially shifted to an extreme right-hand zone, as shown, for example, in FIG. 2. The hollow mandrel will be in position. A blank or tube 100 of soft glass is selected. With the form provided by shells 101 and 102 having an outside diameter of 0.375 inch, tube 100 conveniently has an internal diameter of 0.4 inch. A pellet 27 is provided within the form or shell cups, and the latter, as in FIG. 6, are disposed upon the mandrel by being shifted to abut the positioning flange 99. Under these circumstances, and as diagrammatically shown in FIG. 7, they will be maintained in position conveniently by the magnet 103, by gravity, or by any other suitable expedient. The mandrel may if desired be coated with a suitable substance. The glass form or tube is slipped over the mandrel and the cups 101—102, as illustrated in FIG. 8. At that time the head stock assembly is actuated, thereby centering the tube blank 100 and sealing the head stock end.

This actuation involves admitting air through line 69 and passage 67 to the rear of the piston skirt as defined by the packing 83. With such admission, this member will be shifted to the right as viewed in FIG. 12, thus causing an expansion of ring 90 to force the latter into sealing contact with the inner face of tube 100. Simultaneously, the fingers 88 of the collet 87 will expand into contact with the bore of tube 100. This action will maintain that tube concentrically disposed with respect to the mandrel and the forming member or shell assembly mounted thereon. The outer or right-hand end of the hollow mandrel will be disposed to extend through the bore of the tail stock spindle assembly and will lie in a position within the same where it may exert a proper aspirating action incident to the discharge of air under high velocity from the free end of the mandrel. Thereafter, the tail stock may be shifted to a position at which its spindle assembly 63 is introduced into the bore of the tube and expanded to seal the rear end of tube 100. In shifting the tail stock in this manner, it will be understood that the cylinder 110 and piston rod 111, as controlled by valve assembly 114, will bring the tail stock to the precise position desired. This will involve clearance beyond the right ends of the mandrel and tube 100, then a suitable telescopic disposition of spindle assembly 63 within the right-hand end of tube 100 and an expanding of the tail stock assembly into proper engagement with the adjacent tube bore surface.

With the latter position established, the solenoid of valve assembly 107 will cause that valve to be opened to supply air from line 125 line 106 and the bore of the mandrel. This air will be at room temperature and will pass at high velocity through the mandrel. The vibrator 104 is conveniently energized to axially reciprocate the mandrel. As a consequence of the support afforded by the vibrator to the mandrel, the latter is maintained against rotation. Spindle assemblies 62 and 63 will be rotating in synchronism to turn tube 100 as a consequence of their gears 65 being rotated by the sprocket shaft 34. Gas and oxygen in a properly proportioned mixture are caused to flow to the manifold of opposed burners 57. A spark is created between terminals 59, which serves to ignite this gas. Solenoid 50 is actuated to cause burner carriage 49 to be operatively coupled with portion 41 of the screw-threaded shaft and begin movement from right to left, as viewed in FIG. 2. Thus, with the parts in the positions indicated in FIG. 8, a condition is created as diagrammatically indicated in FIG. 9, in which an area of tube 100 adjacent the tail stock has begun to constrict after it has reached a suitable softening temperature. This result obtains solely due to the surface tension of the glass as it is rendered plastic. As the tube reduces in diameter, the clearance between its bore and the adjacent surface of the mandrel is greatly reduced.

Under these conditions the valve controlled by solenoid 109 is open. Therefore, while the suction created by the structure of FIG. 15, or otherwise, will exist, it will be largely ineffective to produce any useful result, because of the large clearance between the mandrel surfaces and the bore surface of tube 100. However, as the glass shrinks toward the mandrel due to its natural surface tension in the then plastic condition of its body, clearance will be reduced. This reduction will finally result in contact between the tube and mandrel adjacent the zone of flame impingement on the former. Accordingly, a condition of vacuum of approximately 27 inches of mercury will exist within tube 100 between this zone and the tail stock. It follows that with the flames developed by burners 57 continuing to impinge on the exterior surface of the tube 100, and with the burner carriage moving from right to left, as in FIGS. 9 and 10, the bore diameter of that tube is reduced by atmospheric pressure to that of the mandrel. This result is further assured by the attenuation of tube 100 as tail stock 32 continues to move from left to right during this forming operation. Under these conditions, a tolerance of tube bore on the order of .000020 inch will obtain.

The conforming of the tube to the mandrel is, however, only momentary. Immediately after the flame has traveled beyond a given zone of the tube, a clearance between the mandrel and bore surface of that tube comes into being. This is explained by the fact that, assuming the temperature produced by the flame raises the temperature of the glass to approximately 1700° F., the adjacent mandrel zone will have its temperature increased to approximately 700° F. This will result in an expansion of the mandrel in an area in line with the flame. It is to be borne in mind that cooling air is rushing at high velocity through the mandrel bore. Due to the coefficient of expansion existing with respect to glass and metal, the mandrel will, therefore, quickly shrink away from the tube after the flame has passed beyond a given point. This results in clearance between the mandrel and the tube bore. It is in many respects preferred to employ a mandrel with a tapered configuration. However, the areas 96 and 98 of the mandrel might be truly cylindrical, or only one of them might be tapered. Regardless of this, the exterior of the capillary portion of the pipette, as at 25 in FIG. 14, in its formation around area 98' of the mandrel, is tapered along its outer face. This tapering results from the tension of the glass. The movement of the tail stock to the right, carrying with it the adjacent end of tube 100, may also contribute to some degree to this result.

During the entire formation as heretofore described, as well as in the formation of the aspirating tube portion 28 of the pipette, the bore of the tube 100 in advance of the zone of flame impingement thereon is in communication with the atmosphere. This, of course, is due to the fact that the interior of that tube at its left-hand end is in communication with passages 76 and 75, which vent through passages 77 and tube 70. As a consequence, no bubbles of air will be trapped within the tube to deform its bore. Also, during the entire operation the mandrel is vibrated. This serves to smooth out any unevenness in the formed bore and displace any discrete particles included in tube 100 which might otherwise flaw the bore. It will be understood that even although the mandrel may not be truly circular, this will have no detrimental effect on the bore of the tube, in that the mandrel remains stationary while the tube rotates, thus assuring a perfectly circular bore in the latter.

The movement of the tail stock 32 continues to the right, and that of the flame carriage supporting the burner nozzles 57 continues to the left, until the flames impinge on that area of tube overlapping the right-hand end of the form provided by the shells 101—102, as indicated in full lines in FIG. 10. At that moment, the lowermost of the cams or actuators 95, as in FIG. 2, operates the corresponding switch in bank 96. This results in an interruption of fuel flow to the manifold of burners 57 and a consequent extinguishing of the flames, as in broken lines in FIG. 10. Simultaneously, tail stock 32 ceases its movement to the right, in that current through solenoid 40' is interrupted. However, flame carriage 49 continues in its movement to the left until the intermediate actuator of group 95 engages the aligned switch in group 96.

At that time, movement of the flame carriage 49 is interrupted by de-energizing solenoid 50, which thus disconnects the carriage from the feed screw portion 41. Vent solenoid 109 is caused to close tube 70 against the flow of fluid, thereby interrupting communication between the interiors of head stock tubes 64 and 73 and the atmosphere. A vacuum of short duration is created within this bore by actuating the vacuum-controlling solenoid 140 (FIG. 13), which by means of a line 141 is connected to line 70. The opposed burners 57 will now be in the positions shown in FIGS. 10 and 11 in broken lines. At this moment, gas is again caused to flow to these burners, and by means of the sparking structure 59 the fires are re-ignited. Also, valve 109 is opened to again provide communication to the atmosphere through tube 70, and also valve 140 is actuated to shut off communication to the source of vacuum. Shortly thereafter, the flame carriage 49, by operation of solenoid 50, is coupled to the threaded rod portion 41, with resultant further movement on its part from right to left.

This movement will continue until the flame carriage reaches a position adjacent the head stock 31 (in full lines in FIG. 11) at which time the uppermost actuator or cam in series 95 will engage with the corresponding microswitch 96. Simultaneously with this movement of the flame carriage, tail stock 32 will be moving to the right incident to the energization of solenoid 40', which couples the tail stock with threaded portion 40 of the feed shaft. Just prior to the flame carriage reaching a position adjacent the head stock, solenoid 40' is de-energized and solenoid 40" is energized. This results in the tail stock being coupled for movement by the threaded portion 39 of the feed shaft. That movement will be at a greater rate of speed than is caused by the pitch of the threads on portion 40 of such shaft. The final position of the tail stock is determined by the coaction of cams or actuators 94 with the microswitches 93. With the cessation of movement on the part of the flames, solenoid valves 131 and 134 are energized to cause a flow of fuel mixture through lines 137 and 138 to the burner assembly 60. Simultaneously, solenoid valve 123 actuated to cause the flash igniter to initiate a flame at this point. That flame results in the formation of bulb portion 26 of the pipette in the present exemplification. More particularly, the flames emanating from burner group 60 remain ignited under continued turning of the tube 100 until the glass in the area of the form or shell assembly 101—102 has become relatively soft. When this occurs, further flow of fuel through lines 137 and 138 is interrupted, and a vacuum is drawn in this area of the tube by closing the lines 70 and 141 through energizing the valve assembly 109 and vacuum solenoid 140, whereby a vacuum is drawn through lines 141 and thence line 70, as in FIG. 13.

Any suitable substance or solution which may have been used to coat shells 101—102 is burned off during the carrying forward of the process and passes out with the flow of air to the outer atmosphere. The action of the opposed burners 57 adjacent that zone of tube 100 which encloses the form or shell causes the bore of the tube to drape around the latter, especially as atmospheric pressure assists in such action. Such conforming is finalized, of course, by the action of the burner 60 against the tube and with the assistance of atmospheric pressure due to the continuing action of vacuum. In the latter connection, it is to be borne in mind that the tube, immediately after conforming contact with the mandrel, has its bore clearing the surface of the latter, so that suction may act within the intervening spaces.

As shown in FIG. 14, the outer end of the aspirating tube portion 23 of the pipette is preferably tapered, so that it may be conveniently manipulated. For example, the end of a flexible tube may be sealed in engagement with such tapered surface. This configuration is assured during the final stages of the operation by the relatively rapid movement of the tail stock away from the head stock, which causes attenuation of the tube within this heated and still plastic zone. It will be understood that the spindles are not rotated at high speed. Otherwise, under the action of centrifugal force, glass might be thrown off or the tube distorted where subjected to a high temperature. The machine, as illustrated, should always be operated to have the flame carriage move from right to left as viewed in the present drawings. A return of the carriage to its initial position after completion of a full cycle, at the time the formed product is to be removed from the machine, may be achieved by the operation of control 33'.

After the unit has been formed and removed from the machine, a wire is inserted through the bore of the pipette and the latter is preheated. Thereupon, the surplus tip zone of the unit may be drawn down and a gauging operation resorted to. The pipette may now be subjected to a facing and beveling operation involving the end surface of the capillary tube, so that the latter is properly formed and contoured.

Following this, a solution of nitric and hydrochloric acids diluted with water may be provided. A number of pipettes are placed in containers, which may be formed of polyethylene. These, together with the pipettes embraced therein, are immersed in this solution for approximately half an hour. During this immersion the parts may be subjected to the action of vacuum and atmospheric pressures alternately. Under those circumstances, the acid solution is flushed through the bores of the units, thereby reducing and finally eliminating the metallic shells within these bores. Following this, the bores are rinsed with water. A dilute solution of hydrofluoric acid may then be employed to clean the interior surfaces of the pipettes. This, however, does not change the measurable dimensions of those surfaces. Following this, the bores are flushed by water jets, which may be produced by needle-type nozzles.

A quantity of the pipette units so produced may vary somewhat in thir individual capacities. This will be because the shells or forming units will vary in dimensions. The same will be true of the contained beads 27. However, despite this fact, tolerance will be maintained within 1%, which is well below the permissible limits, as established by the National Bureau of Standards. Nevertheless, the volume of the mixing chamber may—in an abundance of caution—be determined, and a ratio established between its capacity and the volume of the capillary tube portion 25. The pipettes conveniently are grouped according to several classifications which have been established, and subject to the classifications into which particular units fall, the application of the capacity marks or indicia occurs.

When the units have reached this condition, they may be subjected to the action of a furnace in order to relieve stresses and to permanently affix the indicia. Thereafter, the surplus large end of the tube extending beyond the aspirating portion is cut off, and the adjacent surfaces are smoothed and beveled.

As afore brought out, the inner face of the diluent bulb or chamber 26 has a frosted appearance incident to the sandblasting of the tube 100 prior to its mounting on the mandrel. This appearance is enhanced by the action of the acid as the latter "eats out" the form or shell 101—102. Consequently, as has been brought out, it is apparent to the user whether the bulb is wet or not, according to whether the bulb appears substantially transparent or translucent. Where the form includes a ridge adjacent the abutting surfaces of the shell or cup sections, a similar surface is included in the interior of the chamber 26. Such ridge assures a more even dispersion of the components included in the solution prepared within that chamber. For example, where the pipettes are to be used for the purpose of determining white cell counts, as against red cell counts, obviously mandrels of a different size may be employed to include in the finished articles the necessary ratio of capacities.

Thus, among others, the several objects of the invention as specifically aforenoted are achieved. Obviously, numerous changes in construction and rearrangements of the parts may be resorted to, and the steps of the method may be varied, without departing from the spirit of the invention as defined by the claims.

I claim:

1. Apparatus for use in forming a tubular glass article of relatively smaller bore from a tubular glass blank of relatively larger bore by shrinking it around a mandrel which comprises a first supporting assembly for supporting a first end of a tubular glass blank, a second supporting assembly for supporting a second end of a tubular glass blank, a tubular mandrel extending between the first and second supporting assemblies, means for providing communication between the atmosphere and the space between the mandrel and a glass blank assembled therearound at the said first end thereof, a source of heat for softening the glass in a tubular blank supported between the supporting assemblies and mounted for movement between the two supporting assemblies, and means for introducing a cooling fluid through the end of the mandrel adjacent the first supporting assembly, said mandrel having an open discharge end adjacent the second supporting assembly and said second supporting assembly having a passageway extending longitudinally therethrough surrounding and extending beyond the discharge end of the mandrel forming an aspirating chamber so that fluid discharging from said mandrel produces an aspirating effect to cause air to be sucked through said passageway from the space between the mandrel and a tubular glass blank supported by the supporting assemblies.

2. Apparatus for use in forming a tubular glass article of relatively smaller bore from a tubular glass blank of relatively larger bore by shrinking it around a mandrel as set forth in claim 1 in which means are provided for shifting the source of heat in a direction from the second supporting assembly towards the first supporting assembly as cooling fluid is flowed through the mandrel.

3. Apparatus for use in forming a tubular glass article of relatively smaller bore from a tubular glass blank of relatively larger bore by shrinking it around a mandrel as set forth in claim 1 having means for providing relatively rotary motion between the mandrel and the first and second supporting assemblies and a glass blank supported thereon as cooling fluid is flowed through the mandrel.

4. Apparatus for use in forming a tubular glass article of relatively smaller bore from a tubular glass blank of relatively larger bore by shrinking it around a mandrel as set forth in claim 1 having means for providing relative oscillatory motion between the mandrel and the first and second supporting assemblies and a glass blank supported thereon as cooling fluid is flowed through the mandrel.

5. Apparatus for use in forming a tubular glass article of relatively smaller bore from a tubular glass blank of relatively larger bore by shrinking it around a mandrel as set forth in claim 1 having means for providing relative shift movement away from each other between said first and second supporting assemblies as cooling fluid is flowed through the mandrel.

6. Apparatus for use in forming a tubular glass article of relatively smaller bore from a tubular glass blank of relatively larger bore by shrinking it around a mandrel as set forth in claim 1 in which each of the first and second supporting assemblies includes a fluid pressure operated expansible and contractible chuck for engaging the interior of a tubular glass blank.

References Cited in the file of this patent

UNITED STATES PATENTS

| | | |
|---|---|---|
| 1,583,464 | Houskeeper | May 4, 1926 |
| 1,912,405 | Ronci | June 6, 1933 |
| 2,084,811 | Keen | June 22, 1937 |
| 2,106,193 | Sloan | Jan. 25, 1938 |
| 2,209,739 | Meyer | July 30, 1940 |
| 2,271,658 | Miller | Feb. 3, 1942 |
| 2,368,169 | Smith | Jan. 30, 1945 |
| 2,423,113 | Pfleghar | July 1, 1947 |
| 2,458,934 | Everett | Jan. 11, 1949 |
| 2,470,234 | Brewer | May 17, 1949 |
| 2,490,252 | Brewer | Dec. 6, 1949 |
| 2,507,300 | Everett | May 9, 1950 |
| 2,531,394 | Campbell | Nov. 28, 1950 |
| 2,532,091 | Everett | Nov. 28, 1950 |
| 2,582,818 | Coby | Jan. 15, 1952 |
| 2,613,479 | Stong | Oct. 14, 1952 |
| 2,711,055 | Majkrzak et al. | June 21, 1955 |
| 2,754,626 | Porter | July 17, 1956 |
| 2,771,710 | Molinan et al. | Nov. 27, 1956 |
| 2,779,135 | Eisler | Jan. 29, 1957 |
| 2,811,813 | Paulson | Nov. 5, 1957 |
| 2,822,501 | Poulter | Feb. 4, 1958 |
| 2,835,079 | Camarata et al. | May 20, 1958 |
| 2,923,097 | Hollinger | Feb. 2, 1960 |